United States Patent
Wieckhorst et al.

(10) Patent No.: US 9,873,296 B2
(45) Date of Patent: Jan. 23, 2018

(54) METHOD AND SYSTEM FOR REDUCING VEHICLE OSCILLATIONS

(71) Applicant: CLAAS TRACTOR SAS, Velizy-Villacoublay (FR)

(72) Inventors: Jan Carsten Wieckhorst, Paderborn (DE); Thomas Fedde, Delbrueck (DE)

(73) Assignee: CLAAS Tractor SAS, Velizy-Villacoublay (FR)

( * ) Notice: Subject to any disclaimer, the term of this patent is extended or adjusted under 35 U.S.C. 154(b) by 104 days.

(21) Appl. No.: 14/854,440

(22) Filed: Sep. 15, 2015

(65) Prior Publication Data
US 2016/0082789 A1    Mar. 24, 2016

(30) Foreign Application Priority Data
Sep. 18, 2014 (DE) .......................... 10 2014 113466

(51) Int. Cl.
B60C 23/00 (2006.01)

(52) U.S. Cl.
CPC .......... B60C 23/004 (2013.01); B60C 23/002 (2013.01)

(58) Field of Classification Search
CPC ..... B60C 23/002; B60C 23/004; B60C 23/04; B60C 23/0408; B60C 23/0488; B60C 23/10
See application file for complete search history.

(56) References Cited

U.S. PATENT DOCUMENTS

| | | | | |
|---|---|---|---|---|
| 5,327,346 A | * | 7/1994 | Goodell | B60C 23/003 152/416 |
| 6,144,295 A | * | 11/2000 | Adams | B60C 23/003 137/224 |
| 6,589,135 B2 | | 7/2003 | Miller | |
| 2007/0044881 A1 | * | 3/2007 | Skoff | B60C 23/002 152/416 |
| 2013/0174938 A1 | | 7/2013 | Vanstevich | |
| 2014/0081555 A1 | * | 3/2014 | Seelke | F02D 45/00 701/102 |
| 2015/0290985 A1 | * | 10/2015 | Martin | B60C 23/001 701/70 |

FOREIGN PATENT DOCUMENTS

| | | | | |
|---|---|---|---|---|
| DE | 10238346 | | 3/2003 | |
| EP | 1757472 | | 2/2007 | |
| EP | 2583543 | | 4/2013 | |
| JP | 58-8411 | | 1/1983 | |
| WO | WO-2013013917 A1 | * | 1/2013 | .......... A01B 63/112 |

* cited by examiner

*Primary Examiner* — Stephen Holwerda
(74) *Attorney, Agent, or Firm* — Collard & Roe, P.C.

(57) ABSTRACT

A method for reducing vehicle oscillations for an agricultural vehicle with a drive engine, a running gear cooperating with the drive engine for driving wheels having pneumatic tires, and a control unit for regulating a tire pressure of at least one tire requires a number of steps. For example, the method includes generating a sensor signal as a function of at least one determined vehicle oscillation and regulating a tire pressure of at least one tire by the control unit as a function of the sensor signal in order to reduce the determined vehicle oscillation.

8 Claims, 2 Drawing Sheets

METHOD AND SYSTEM FOR REDUCING VEHICLE OSCILLATIONS

CROSS-REFERENCE TO A RELATED APPLICATION

The invention described and claimed hereinbelow is also described in German Priority Document DE 10 2014 113466.4, filed on Sep. 18, 2014. The German Priority Document, the subject matter of which is incorporated herein by reference, provides the basis for a claim of priority of invention under 35 U.S.C. 119(a)-(d).

BACKGROUND OF THE INVENTION

The invention relates to a method and a system for reducing a vehicle oscillation of an agricultural vehicle.

With respect to agricultural vehicles, in particular tractors having pneumatic-tired wheels, it has been known for a relatively long time that the vehicle can bounce and undergo a so-called "power hop", for example, during tillage with an implement drawn by the agricultural vehicle. These vehicle oscillations, i.e. the power hop, are substantially vertical vehicle oscillations which are superimposed on the forward motion of the agricultural vehicle. These vehicle oscillations occur, in particular, in agricultural vehicles such as tractors having four-wheel drive, which draw implements having a moderate to high demand for tractive force on dry ground. The substantially vertical vehicle oscillations can continuously increase, whereby the traction of the agricultural vehicle is reduced and, therefore, the forces that can be transferred onto the ground are reduced. As a result, the tractive force can fluctuate greatly depending on the vertical vehicle oscillations.

Document DE 10 238 346 A1 makes known a method and a control system for reducing positional oscillations of a vehicle, in which a vertical vehicle acceleration is measured by an accelerometer mounted on the vehicle and is used as the basis for generating an acceleration signal as a function of a vehicle motion. In addition, an output signal is generated as a function of the acceleration signal and the fuel supply to the engine is modified as a function of the output signal. The disadvantage thereof is that, due to a reduction of the fuel injection quantity, the drive engine is operated in a partial-load range with correspondingly reduced power and reduced engine torque, whereby the tractive force of the vehicle is reduced. In addition, it is known to reduce the vertical vehicle oscillations that occur by reducing the wheel speeds, although a disadvantage thereof is that this is accompanied by a reduction in the machine output and power and so the system efficiency is also reduced.

SUMMARY OF THE INVENTION

The present invention overcomes the shortcomings of known arts, such as those mentioned above.

To that end, the invention provides a method and a system for reducing substantially vertical vehicle oscillations of an agricultural vehicle, which prevents a reduction of the power of the agricultural vehicle.

In an embodiment, the invention provides a method for reducing vehicle oscillations for an agricultural vehicle comprising a drive engine and a running gear cooperating therewith for driving wheels having pneumatic tires, and a control unit for regulating a tire pressure of at least one tire. According to the method, a sensor signal is generated as a function of at least one ascertained vehicle oscillation, and the tire pressure of at least one tire is regulated by the control unit as a function of the sensor signal, in particular automatically, in order to reduce the ascertained vehicle oscillations.

The regulation of the tire pressure as a function of the sensor signal offers the advantage that the substantially vertical vehicle oscillations can be reduced by changing the rigidity of the tires, whereby it is possible to avoid a reduction of the drive engine torque, for example, due to a reduced fuel injection quantity, and to avoid a reduction in power, which is associated therewith. In this connection, automation offers the advantage that the tire pressure and, therefore, the tire rigidity and damping can be continuously regulated such that the environmental conditions, which change continuously during tillage, can be taken into consideration, and a bouncing of the agricultural vehicle can also be avoided under changing environmental conditions. As a result, it can be ensured that the agricultural vehicle can also be used with high power and efficiency under continuously changing environmental conditions.

In an embodiment, a limit value is specified for the sensor signal, wherein the limit value is stored in a control unit, in particular, and the tire pressure of at least one tire is regulated when the limit value is exceeded. The limit value can be a vehicle-specific limit value, which can be stored in the control unit of the agricultural vehicle. The regulation of the tire pressure can be, in this case, a raising or lowering of the pressure of at least one tire, wherein tires can be regulated individually, for a specific axle, or jointly. The tire pressure is regulated until the sensor signal drops back below the specified limit value. Specifying a limit value makes it possible to tolerate vehicle oscillations up to an extent corresponding to the limit value without the control unit regulating the tire pressure of one or more tires. This offers the advantage that continuous operation of the control unit and excessive wear of the components required to regulate the tire pressure can be avoided.

In an embodiment, the method comprises the steps of lowering the tire pressure of at least one tire to a minimum tire pressure, wherein the minimum tire pressure depends on a load capacity of the tire, and raising the tire pressure, in particular in a stepwise manner, if the sensor signal continues to exceed the limit value, until the sensor signal drops below the limit value. At the tire load capacity limit, the tire has a minimum permissible tire pressure for a given axle load. Next, the sensor value is compared with the limit value in order to assess whether the vehicle oscillations were eliminated. If this is not the case, the tire pressure is raised, in particular in a stepwise manner, until the oscillation is eliminated, which is indicated by the sensor signal dropping below the limit value. By varying the tire pressure to a minimum tire pressure up to the load capacity limit of the tire and then raising the tire pressure, optionally in a stepwise manner, the rigidity and the damping properties of the tire(s) is varied in order to detune the oscillating system and to drop back below the limit value of the sensor signal.

In another embodiment, the respective tire load capacity limit and/or a corresponding minimum tire pressure are stored in the control unit. The tire load capacity limit and/or a corresponding minimum tire pressure is stored in the control unit by an operator depending on the actual vehicle weight. A tire load capacity table in the form of a characteristic map also can be stored in the control unit, for example, wherein the control unit can automatically ascertain the tire load capacity limit and/or the corresponding minimum tire pressure by a sensor for the wheel load, axle load, and/or the vehicle weight. This has the advantage that the operator only needs to enter the corresponding values for the wheel load, axle load, and/or the vehicle weight in the control unit at the beginning of the use of the agricultural vehicle, and the control unit can access this value for the automatic regulation of the tire pressure.

In an embodiment, the sensor signal is generated by a manual input by the operator. In this case, when vehicle oscillations occur, the operator of the vehicle can make an input, for example at a control terminal, when a regulation of the tire pressure should be carried out in order to reduce the vehicle oscillations. The operator determines when the occurring vehicle oscillations exceed a limit value, in particular a subjective limit value, and so, after the input is actuated and the sensor signal is generated, the tire pressure is regulated accordingly.

When the tire pressure is raised in a stepwise manner after having been lowered to a minimum tire pressure, the operator can make another input to define when the limit value is undershot such that the control unit can terminate the variation of the tire pressure. When the limit value is undershot, this means that the disruptive oscillations, in particular the so-called power hop, no longer occur. The undershooting of the limit value is indicated to the control unit by a manual input. The manual generation of the sensor signal has the advantage that the method for reducing the vehicle oscillations can be integrated into an existing system, for example, by integration into the control terminal, in order to regulate the tire pressure with a control unit.

In an embodiment, the sensor signal is generated as a function of a measured actual acceleration of the agricultural vehicle. The limit value of the sensor signal also can be a specified acceleration value in this case. The vertical acceleration of the agricultural vehicle can be measured, for example, by one or more acceleration sensors mounted on the agricultural vehicle. It also is possible to use acceleration sensors that are already mounted on the vehicle, for example acceleration sensors for regulating a damping of the driver's cab, which are fixedly mounted on the vehicle. Using acceleration sensors to generate the sensor signal has the advantage that the substantially vertical vehicle oscillations that occur are directly detected by measuring the vertical acceleration that occurs.

The sensor signal is preferably generated as a function of a measured output torque of the running gear. The occurring, substantially vertical vehicle oscillations result in a fluctuation of the forces that are transferred onto the ground and therefore also induce a fluctuation in the output torque of the running gear. The running gear can be, for example, a hydraulically-mechanically power-split transmission, in which the output torque is ascertained on the basis of the pressures of the hydrostatic units thereof. A corresponding limit value is specified in the form of corresponding pressures or pressure fluctuations of the hydrostatic units. The measurement of the output torque of the running gear offers the advantage that existing sensor systems can be used when retrofitting is carried out.

In another embodiment, the sensor signal is generated as a function of a measured tractive force required to draw an implement which is connected to the agricultural vehicle. The substantially vertical vehicle oscillations result in forces which fluctuate as a result and can be transferred onto the ground and therefore also induce a dynamically fluctuating change in the tractive force. A limit value in this case can be a value of the tractive force and/or a tractive-force fluctuation that must not be exceeded, which value can be entered into the control device, for example. Generating the sensor signal as a function of the measured tractive force offers the advantage that existing sensors, for example, for measuring force at a three-point lifting unit, can be used to ascertain the tractive force.

The sensor signal is preferably generated as a function of a measured wheel load, axle load and/or a vehicle weight. The load is measured at the individual wheels or the axles or the overall weight of the agricultural vehicle is determined by appropriate sensors. Suitable load values and/or weight values can be specified as limit values such that an occurring power hop is indicated when these limit values are exceeded. The use of wheel loads, axle loads and/or the vehicle weight to generate the sensor signal offers the advantage that the vehicle weight is determined by the corresponding load sensors and also can be used for the automatic determination of the tire load capacity limit. This has the advantage that a determination of the vehicle weight by the operator and/or an input of the vehicle weight by the operator is omitted and the automatic determination of the minimum tire pressure is improved.

The invention further relates to a system for reducing vehicle oscillations for an agricultural vehicle comprising a drive engine and a running gear cooperating therewith for driving wheels having pneumatic tires and comprising a control unit for regulating a tire pressure of at least one tire, wherein a sensor signal is generated as a function of at least one ascertained vehicle oscillation and the tire pressure of at least one tire is regulated by the control unit as a function of the sensor signal, in particular, automatically, in order to reduce the ascertained vehicle oscillation. As a result, the vertical vehicle oscillations are eliminated by changing the rigidity of the tire, thereby making it possible to avoid a reduction in power, for example, due to a reduction of the fuel injection quantity. As a result, it is ensured that the agricultural vehicle also can be used with high power and efficiency under changing environmental conditions and by a less-experienced operator.

The invention further relates to an agricultural vehicle comprising a system of the type depicted above for reducing vehicle oscillations.

BRIEF DESCRIPTION OF THE DRAWINGS

Further features and advantages of the invention will become apparent from the description of embodiments that follows, with reference to the attached figures, wherein.

DETAILED DESCRIPTION OF THE INVENTION

The following is a detailed description of example embodiments of the invention depicted in the accompanying drawings. The example embodiments are presented in such detail as to clearly communicate the invention and are designed to make such embodiments obvious to a person of ordinary skill in the art. However, the amount of detail offered is not intended to limit the anticipated variations of embodiments; on the contrary, the intention is to cover all modifications, equivalents, and alternatives falling within the spirit and scope of the present invention, as defined by the appended claims.

Figure 1:
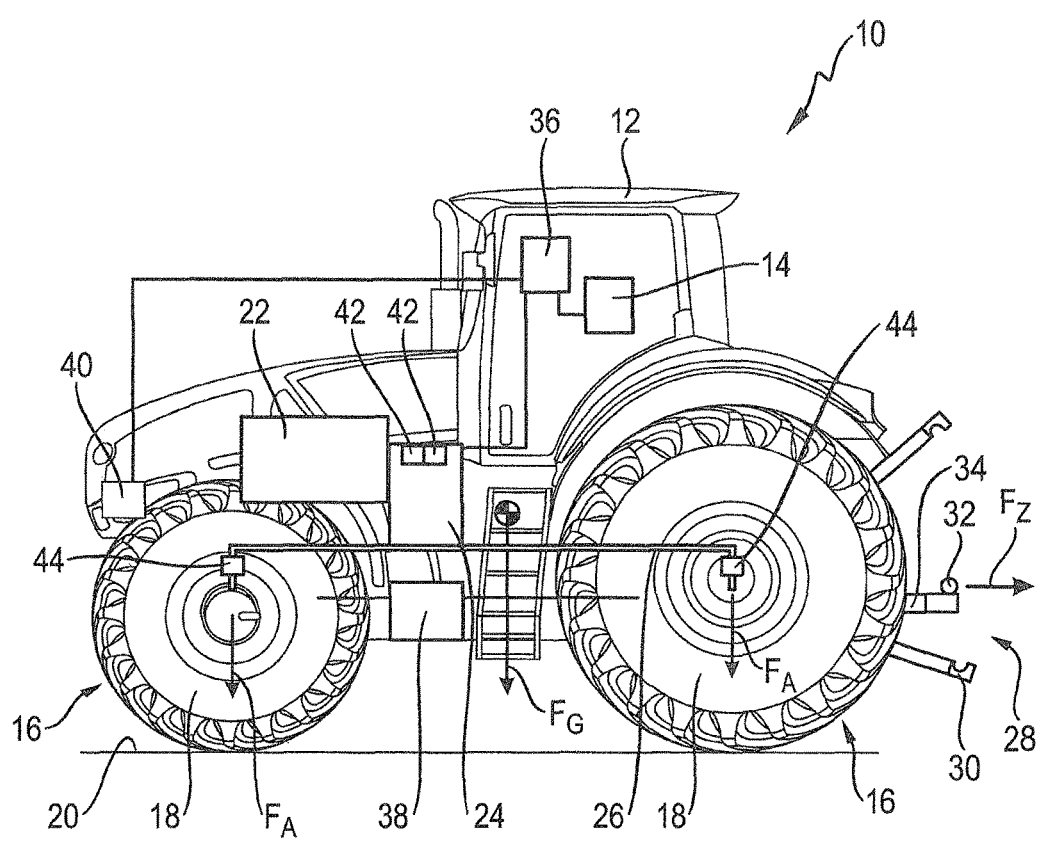
FIG. 1: presents a schematic side view of an agricultural vehicle.

FIG. 1 presents a schematic illustration, from the side, of an agricultural vehicle 10 in the form of a tractor, wherein the basic design of a tractor is assumed to be known to a person skilled in the art. The agricultural vehicle 10 may embody any vehicle that useable for agricultural work, for example, a tractor, a telehandler, a construction machine or a self-propelled harvesting machine.

The agricultural vehicle, i.e., tractor 10, comprises a closed driver's cab 12 for accommodating an operator, wherein a control terminal 14 for operating the agricultural vehicle 10 is arranged within the driver's cab 12. The agricultural vehicle 10 comprises a plurality of wheels 16 arranged on a front axle and a rear axle. The wheels 16 each have pneumatic tires 18, which are engaged with a ground 20, in particular in order to transfer drive forces. The wheels 16 are driven by a drive engine 22, which is designed in the form of an internal combustion engine, and by a running gear 24 cooperating therewith.

The running gear 24 is designed in the form of a hydraulically-mechanically power-split transmission comprising hydrostatic units 42 in the hydraulic power branch. An output torque of the running gear 24 is transferred to the wheels 16 via a drive train 26, which is schematically illustrated, wherein the illustrated agricultural vehicle 10 is a four-wheel drive vehicle. The agricultural vehicle 10 comprises various coupling devices 28 for drawing an agricultural implement (not illustrated). The illustrated tractor comprises both a three-point lifting unit 30 and a swinging drawbar 32, for example at the rear. An implement coupled to the swinging drawbar, for example, induces a tractive force $F_Z$ which acts substantially horizontally on the swinging drawbar 32. The tractive force $F_Z$ is measured via a tractive force sensor 34, for example.

During tillage of the ground 20, the agricultural vehicle 10 may begin to bounce substantially in the vertical direction, in particular given dry ground 20 and a moderate to high tractive force $F_Z$. These substantially vertically occurring vehicle oscillations are also known by the term "power hop". These vertical vehicle oscillations can not only become unpleasant for the operator of the agricultural vehicle 10, but also can result in a fluctuation of the forces that can be transferred onto the ground and, therefore, in a dynamic fluctuation of the axle load $F_A$, the tractive force $F_Z$, and the output torque in the running gear 24, whereby damage can also occur to the agricultural vehicle 10 and/or the implement coupled thereto.

According to the invention, a sensor signal S is generated as a function of at least one ascertained vehicle oscillation, in particular, a vertical vehicle oscillation, and a tire pressure of at least one tire is automatically regulated as a function of the sensor signal S by a control unit 36, which is arranged in the driver's cab 12, in order to reduce the ascertained vehicle oscillation. The ascertained vehicle oscillation can be a substantially vertical vehicle oscillation and/or a substantially horizontal vehicle oscillation, for example caused by a dynamic fluctuation of the tractive force $F_Z$ which acts in the horizontal direction.

Depending on the ascertained vehicle oscillation, a sensor signal S is generated, for example, by the control unit 36, which is used to regulate the tire pressure of at least one tire 18. In order to regulate the tire pressure of one or more tires 18, the agricultural vehicle 10 comprises a tire pressure control system 38, which can be regulated by the control unit 36. The control unit 36 can be integrated into the tire pressure control system, for example. As a result, the tire pressure of one or more tires 18 can be regulated within the permissible operating parameters. A regulation of the tire pressures of the tires 18 can be carried out continuously as a function of the sensor signal S.

In order to avoid a sustained operation of the tire pressure control system 38, a limit value $S_G$ for the sensor signal S is specified and stored in the control unit 36. A regulation of the tire pressure of the tires 18 is then carried out only when the sensor signal S exceeds the limit value $S_G$, whereby vehicle oscillations up to an extent corresponding to the limit value $S_G$ are tolerated without triggering a regulation of the tire pressures. The sensor signal S is generated by a manual input by the operator, for example into the control terminal 14, wherein the input by the operator also corresponds to the limit value $S_G$ of the sensor signal S being reached. In addition, the sensor signal S is generated as a function of a measured acceleration of the agricultural vehicle 10. In this case, an acceleration sensor 40 is arranged on the front side, for example, of the agricultural vehicle 10, whereby substantially vertical vehicle oscillations and/or horizontal vehicle oscillations can be directly measured.

A regulation of the tire pressure of the tires 18 is carried out when suitably specified acceleration values are exceeded, the associated sensor signals S of which correspond to the limit value $S_G$. The sensor signal S also can be generated as a function of a measured output torque of the running gear 24. In this case, the pressures can be measured at the hydrostatic units 42 of the hydraulically-mechanically power-split running gear 24 and, if specified limit values that correspond to the limit value $S_G$ are exceeded, a regulation of the tire pressure of the tires 18 can be carried out. Likewise, a sensor signal S is generated by the tractive force sensor 34 as a function of the measured tractive force $F_Z$. The limit value $S_G$ in this case is a specified limit value $S_G$ of the permissible tractive force $F_Z$, for example. The sensor signal S also can be generated as a function of a measured wheel load, axle load $F_A$ or a vehicle weight $F_G$. A load sensor 44 for determining the wheel load and/or axle load $F_A$ is provided on each wheel 16 in order to ascertain the vehicle weight $F_G$ and/or the axle loads $F_A$. The vehicle weight $F_G$ also can be ascertained from the values determined by the load sensors 44. The permissible minimum tire pressure for a given axle load $F_A$ of the agricultural vehicle 10 corresponds to the so-called tire load capacity limit, which is determined from a tire load capacity table. The tire load capacity table is stored in the control unit 36 and from the axle load $F_A$, which is ascertained by the load sensors 44, and/or the vehicle weight $F_G$.

Figure 2:
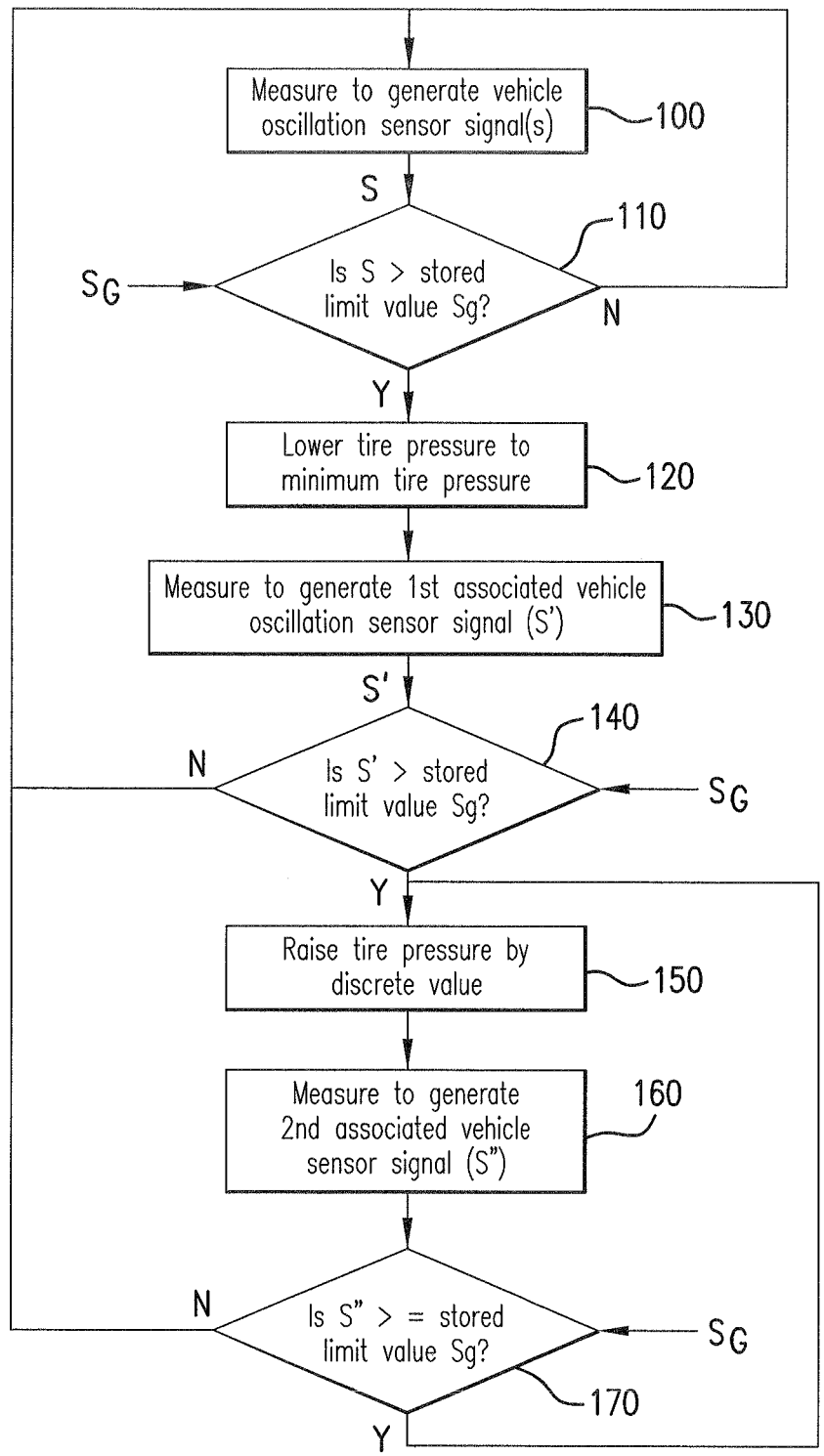
FIG. 2: presents a schematic flow chart for carrying out the method for reducing the vehicle oscillations.

FIG. 2 presents a flow chart of the method for reducing the vehicle oscillation of the agricultural vehicle 10. In a first step 100, the occurring vehicle oscillations are determined, for example by the acceleration sensor 40 and/or the tractive force sensor 35, and an associated sensor signal S is generated as a function of the ascertained vehicle oscillations. In a first decision step 110, the control unit 36 compares the generated sensor signal S with a limit value $S_G$ stored in the control unit 36.

Provided the limit value $S_G$ is not reached by the sensor signal S, the determination of the vehicle oscillations and the generation of the sensor signals S is continued in step 100. When the limit value $S_G$ is reached by the sensor signal S, which can correspond to the occurrence of the so-called power hop vehicle oscillations, then, in a second step of the method 120, the control unit 36 lowers the tire pressure of at least one tire 18 to a minimum tire pressure, which corresponds to the load capacity limit of the tire 18 for a given axle load $F_A$.

In a third step 130, the vehicle oscillations are measured again and a $1^{st}$ associated sensor signal S' is generated. In a second decision step 140, the $1^{st}$ associated sensor signal S' is compared with the specified limit value $S_G$ once more. If the limit value $S_G$ is still exceeded, at least one tire pressure is raised by a discrete value in the subsequent, fourth step 150. In a fifth step 160, the oscillations are measured again and a $2^{nd}$ associated sensor signal S" is generated. The tire pressure of the tire 18 is raised in discrete steps until the associated sensor signal S" drops below the limit value $S_G$, which is monitored in the third decision step 170.

LIST OF REFERENCE NUMBERS

10 agricultural vehicle
12 operator's cab
14 control terminal
16 wheel
18 tire
20 ground
22 drive engine
24 running gear
26 drive train
28 coupling device
30 three-point lifting unit
32 swinging drawbar
34 tractive force sensor
36 control unit
38 tire pressure control system
40 acceleration sensor
42 hydrostatic unit
44 load sensor
S, S', S" sensor signal
$S_G$ limit value
$F_Z$ tractive force
$F_A$ axle load
$F_G$ vehicle weight
100 First step
110 first decision step
120 second step
130 third step
140 second decision step
150 fourth step
160 fifth step
170 third decision step As will be evident to persons skilled in the art, the foregoing detailed description and figures are presented as examples of the invention, and that variations are contemplated that do not depart from the fair scope of the teachings and descriptions set forth in this disclosure. The foregoing is not intended to limit what has been invented, except to the extent that the following claims so limit that.

What is claimed is:

1. A method for reducing vehicle oscillations for an agricultural vehicle comprising a drive engine and a running gear cooperating with the drive engine for driving wheels having pneumatic tires and a control unit for regulating a tire pressure of at least one tire, the method comprising the steps of:

specifying a limit value ($S_G$) for the sensor signal (S, S', S");
storing the limit value in the control unit;
using a tractive force sensor, generating a sensor signal (S, S', S") as a function of at least one determined vehicle oscillation; and
regulating, by the control unit, a tire pressure of at least one tire as a function of the sensor signal (S, S', S") to reduce the at least one determined vehicle oscillation, until the limit value ($S_G$) is exceeded, said step of regulating comprising:
lowering the tire pressure of the at least one tire to a minimum tire pressure, wherein the minimum tire pressure depends on a tire load capacity limit of the tire; and
raising, in a stepwise manner, the tire pressure when the sensor signal (S, S', S") continuously exceeds the limit value ($S_G$), until the sensor signal (S, S', S") drops below the limit value ($S_G$).

2. The method according to claim 1, wherein a tire load capacity limit, a corresponding minimum tire pressure or both is stored in the control unit.

3. The method according to claim 1, wherein the sensor signal (S, S', S") is generated as a function of a measured vertical acceleration of the agricultural vehicle.

4. The method according to claim 1, wherein the sensor signal (S, S', S") is generated as a function of one or more of the following: a measured wheel, a measured axle, and an overall tractive force ($F_Z$) which is required to draw an implement connected to the agricultural vehicle.

5. The method according to claim 1, wherein the sensor signal (S, S', S") is generated as a function of one or more of the following: a measured wheel load, an axle load ($F_A$) and a vehicle weight ($F_G$).

6. A method for reducing vehicle oscillations for an agricultural vehicle comprising a drive engine and a running gear cooperating with the drive engine for driving wheels having pneumatic tires and a control unit for regulating a tire pressure of at least one tire, the method comprising the steps of:

specifying a limit value ($S_G$) for the sensor signal (S, S', S");
storing the limit value in the control unit;
generating a sensor signal (S, S', S") as a function of at least one determined vehicle oscillation; and regulating, by the control unit, a tire pressure of at least one tire as a function of the sensor signal (S, S', S") to reduce the at least one determined vehicle oscillation, until the limit value ($S_G$) is exceeded;
wherein the sensor signal (S, S', S"), is generated as a function of a measured output torque of the running gear, and wherein the step of regulating comprises:
lowering the tire pressure of the at least one tire to a minimum tire pressure, wherein the minimum tire pressure depends on a tire load capacity limit of the tire; and
raising, in a stepwise manner, the tire pressure when the sensor signal (S, S', S") continuously exceeds the limit value ($S_G$), until the sensor signal (S, S', S") drops below the limit value ($S_G$).

7. A system for reducing vehicle oscillations for an agricultural vehicle, comprising
a drive engine;
a running gear cooperating therewith for driving wheels having pneumatic tires;
a tractive force sensor; and
a control unit for regulating a tire pressure of at least one tire;
wherein a sensor signal (S, S', S") is generated as a function of at least one ascertained vehicle oscillation, wherein a limit value ($S_G$) specified for the sensor signal (S, S', S") is stored in the control unit, and a tire pressure of at least one tire is regulated by the control unit as a function of the sensor signal (S, S', S") to reduce the ascertained vehicle oscillation, the regulating carried out until the limit value ($S_G$) is exceeded, and wherein the control unit is configured to regulate the tire pressure by lowering the tire pressure of the at least one tire to a minimum tire pressure, wherein the minimum tire pressure depends on a tire load capacity limit of the tire; and raising, in a stepwise manner, the tire pressure when the sensor signal (S, S', S") continuously exceeds the limit value ($S_G$), until the sensor signal (S, S', S") drops below the limit value ($S_G$).

8. An agricultural vehicle comprising the system for reducing vehicle oscillations according to claim 7.

* * * * *